(12) United States Patent
Otanez et al.

(10) Patent No.: US 8,596,294 B2
(45) Date of Patent: Dec. 3, 2013

(54) HYDRAULIC CONTROL SYSTEM WITH PASSIVE CHARGING OF AN ACCUMULATOR

(75) Inventors: Paul G. Otanez, Troy, MI (US); Casie M. Bockenstette, Clarkston, MI (US); Carlos E. Marin, Oxford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 210 days.

(21) Appl. No.: 13/206,979

(22) Filed: Aug. 10, 2011

(65) Prior Publication Data

US 2013/0037113 A1 Feb. 14, 2013

(51) Int. Cl.
*F16K 17/00* (2006.01)

(52) U.S. Cl.
USPC ................................ 137/455; 60/413; 477/52

(58) Field of Classification Search
USPC ............ 137/455; 60/329, 413, 415, 417, 527, 60/529; 477/52
See application file for complete search history.

(56) References Cited

U.S. PATENT DOCUMENTS

| | | | |
|---|---|---|---|
| 8,069,661 B2 * | 12/2011 | Hendrickson et al. | 60/417 |
| 2010/0048340 A1 * | 2/2010 | Nakamura | 475/129 |
| 2010/0093488 A1 | 4/2010 | Portell et al. | |
| 2010/0226806 A1 | 9/2010 | Mellet et al. | |
| 2011/0011074 A1 * | 1/2011 | Mellet et al. | 60/329 |

* cited by examiner

*Primary Examiner* — John K Fristoe, Jr.
*Assistant Examiner* — Reinaldo Sanchez-Medina

(57) ABSTRACT

A hydraulic control system for a vehicle powertrain with an engine capable of being selectively turned on and turned off includes an accumulator, a plurality of fluid passages through which a fluid flows between the accumulator and a transmission associated with the powertrain, and a smart memory alloy (SMA) valve in fluid communication with at least one of the fluid passages. The SMA valve has a transition temperature. When the temperature of the fluid is less than or about equal to the transition temperature, the SMA valve closes, and when the temperature of the fluid exceeds the transition temperature, the SMA valve opens. When the SMA valve is closed, the accumulator cannot be charged with fluid, that is, the accumulator, does not fill with fluid, and when the SMA valve is open, the accumulator charges with fluid passively.

20 Claims, 3 Drawing Sheets

HYDRAULIC CONTROL SYSTEM WITH PASSIVE CHARGING OF AN ACCUMULATOR

FIELD

The present invention relates to a hydraulic control system for a motor vehicle transmission. More specifically, the present invention relates to a hydraulic control system with an accumulator that is charged passively.

BACKGROUND

The statements in this section merely provide background information related to the present disclosure and may or may not constitute prior art.

A typical vehicle transmission employs a viscous fluid to lubricate the transmission moving parts, as well as, in some transmissions, to provide hydraulic pressure required to operate the transmission. Such fluid is generally supplied to the transmission via a dedicated fluid pump driven by a vehicle's engine. The fluid is typically distributed throughout the transmission through a network of fluid passages while the engine is running. After the engine has been shut down, however, and has remained off for an extended period of time, the fluid generally tends to drain down from the passages into a transmission sump under the force of gravity. Hence, upon engine restart, the transmission fluid may take an appreciable amount of time to establish sufficient pressure before full transmission operation may resume. Accordingly, there is a need for an improved hydraulic control system for motor vehicle transmissions.

SUMMARY

A hydraulic control system for a vehicle powertrain with an engine capable of being selectively turned on and turned off includes an accumulator, a plurality of fluid passages through which a fluid flows between the accumulator and a transmission associated with the powertrain, and a smart memory alloy (SMA) valve in fluid communication with at least one of the fluid passages. The SMA valve has a transition temperature. When the temperature of the fluid is less than or about equal to the transition temperature, the SMA valve closes, and when the temperature of the fluid exceeds the transition temperature, the SMA valve opens. When the SMA valve is closed, the accumulator cannot be charged with fluid, that is, the accumulator, does not fill with fluid, and when the SMA valve is open, the accumulator charges with fluid passively.

In some arrangements, the hydraulic control system includes a solenoid valve in fluid communication with at least one of the fluid passages. When the solenoid valve is open, fluid may discharge from the accumulator regardless if the SMA valve is open or closed.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings.

DETAILED DESCRIPTION

The following description is merely exemplary in nature and is not intended to limit the present disclosure, application, or uses.

Figure 1:
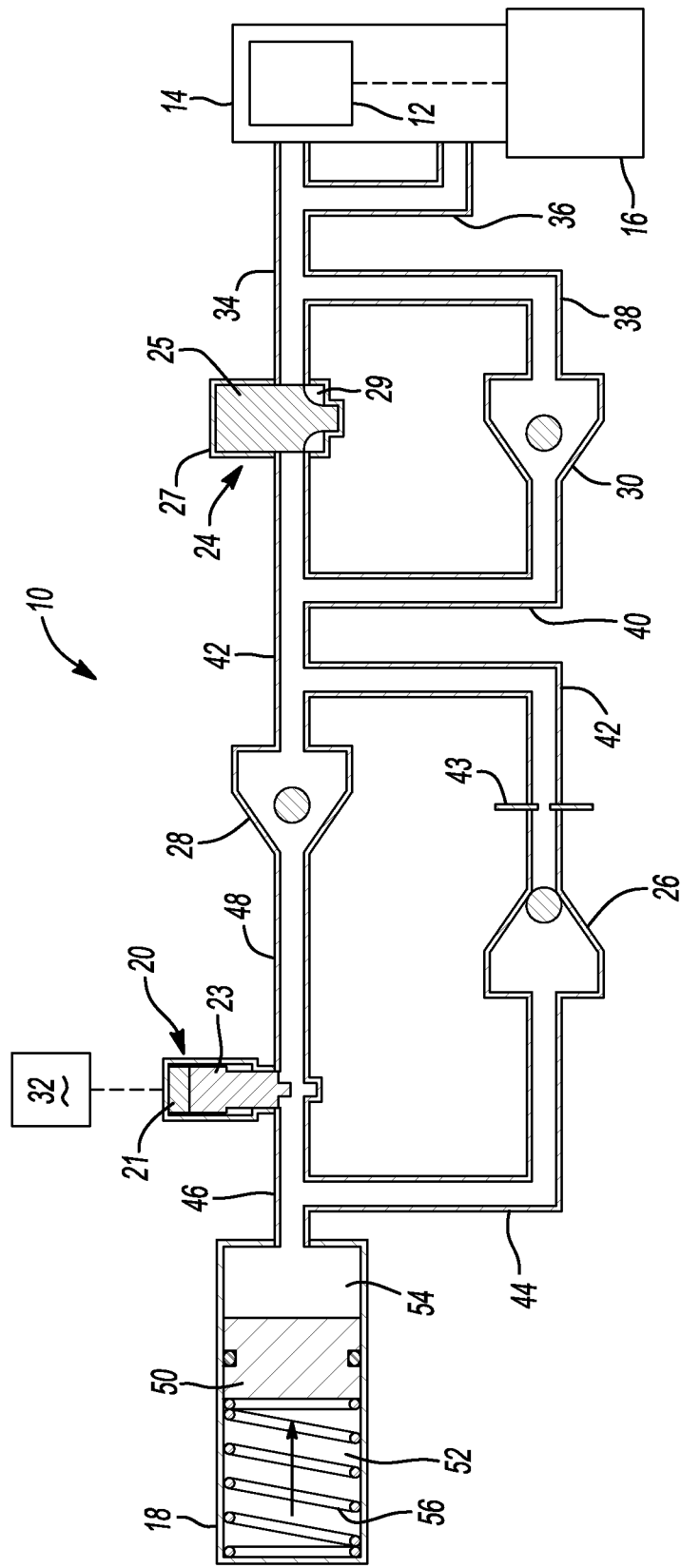
FIG. 1 is a schematic partially cross-sectional side view of a vehicle powertrain hydraulic control system in a first state in accordance with the present invention.
Figure 2:
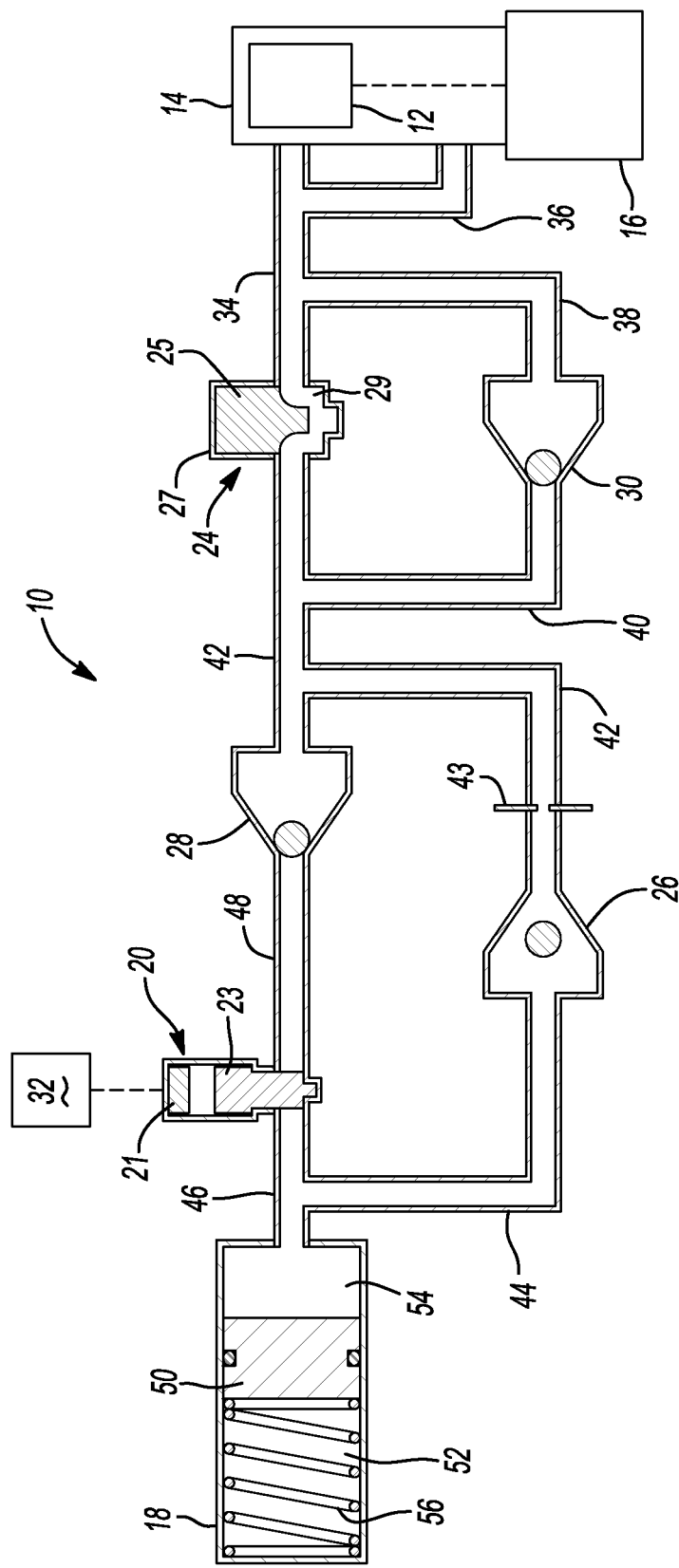
FIG. 2 is a schematic partially cross-sectional side view of a vehicle powertrain hydraulic control system in a second state in accordance with the present invention.

Referring now to the drawings, part of a hydraulic control system 10 for a transmission 14 that is connected to an engine 16 in a vehicle powertrain is illustrated in FIGS. 1 and 2. Generally, a viscous, largely incompressible fluid is utilized in transmissions for cooling and lubrication of moving components, such as gears and bearings. Additionally, in automatic transmissions such a working fluid is also commonly employed for actuating various components that affect gear ratio changes, such as clutches and brakes.

FIGS. 1 and 2 show the hydraulic control system 10 utilizing a fluid pump 12 to provide pressurized fluid via a fluid passage 36 to the transmission 14, that is, to establish transmission line pressure, and via a fluid passage 34 to an accumulator 18. Fluid passages 34 and 36, as well other passages 38, 40, 42, 44, 46, and 48, may be formed by structures such as a transmission casing, a tube external to the transmission, or otherwise. Fluid pump 12 is operatively connected to the engine 16, that is, the pump 12 is driven directly by the engine 16 when the engine 16 is on, and is therefore idle when the engine 16 is off.

The accumulator 18 has an internal piston 50 with a hermetic o-ring seal to seal off a pressure cavity 54 from a cavity 52 housing a piston return spring 56. The seal may also have any other configuration suitable for sealing off the working fluid. The spring 56 is employed to counterbalance a force that results from the fluid line pressure, and to provide gradual movement of the piston 50 into the cavity 56 when the accumulator is accumulating fluid, that is, the cavity 52 is being filled. Spring 56 is also utilized to provide a piston return force when the accumulator 18 is being discharged. Although the accumulator 18 is shown with the piston 50 being supported by the spring 56, other mechanisms may be employed to perform such a function. For example, a compressed gas may be utilized in cavity 52 to pressurize the piston 50 to provide the return force for affecting the discharge of the fluid. In other implementations, a combination of a compressed gas and a spring may be employed to impart a return force on the piston.

Other components of the hydraulic control system 10 include a solenoid valve 20, a smart memory alloy (SMA) valve 24, a set of three ball check-valves 26, 28, 30, and an orifice 43, as well as the passages 34, 36, 38, 40, 42, 44, 46, and 48 that provide pathways or channels for the fluid to flow back and forth between the accumulator 18 and the transmission 14. The solenoid valve includes an electro-magnet 21 and a poppet valve member 23. The solenoid 20 is controlled via an algorithm programmed into the electronic controller 32. The controller can be the engine controller, the transmission controller, the controller associated with a battery pack control module such as those employed in hybrid type vehicles, a component of a body module, a hybrid control module, or a combined engine/transition module or any other suitable controller associated with the vehicle, such as, for example, a controller for the vehicle's entertainment system.

The SMA valve 24 includes a valve member 25 made of a smart memory alloy attached to a housing 27. Shape memory alloys have the desirable property of becoming rigid, that is, returning to a remembered state, when heated above a transition temperature. A shape memory alloy suitable for the valve member 25 is Ni—Ti available under the more commonly known name Nitinol. When this material is heated above the transition temperature, the material undergoes a phase transformation from martensite to austenite, such that the material returns to its remembered state. The transition temperature is dependent on the relative proportions of the alloying elements Ti and Ni (Ni—Ti) and the optional inclusion of alloying additives. Note that any other suitable shape memory alloy may be used for the valve member 25 such Ag—Cd, Au—Cd, Au—Cu—Zn, Cu—Al, Cu—Al—N, Cu—Zn, Cu—Zn—Al, Cu—Zn—Ga, Cu—Zn—Si, Cu—Zn—Sn, Fe—Pt, Fe—Ni, In—Cd, In—Ti, and Ti—Nb.

In a particular implementation, the valve member 25 is made from Nitinol with a desired transition temperature. Thus, when the temperature of the fluid, such as an automatic transmission fluid, in contact with the valve member 25 is less than the transition temperature, the valve member 25 is in the martensitic state to close the path between the passage 34 and a passage 42 (FIG. 1).

When the fluid temperature exceeds the transition temperature the alloy in the valve member 25 transform to austenite, such that the valve member returns to its remembered state, which in this case is a contracted state (FIG. 2) allowing fluid to flow from the passage 34 through the valve 24 to the passage 42. Further, if the line pressure in the passage 42 exceeds that in the passages 44 and 48 and if the line pressure in the passage 38 exceeds the line pressure in the passage 40, the ball check-valves 30 and 28 become seated while the ball check-valve 26 becomes unseated to allow fluid to flow to the accumulator 18 when the solenoid valve 20 has been instructed by the electronic controller 32 to close. Note that the ball check-valve 28 is optional; the hydraulic control system 10 can operate without the ball check-valve 28.

As such, the accumulator 18 becomes charged with fluid when fluid line pressure supplied by the pump 12 is greater than the pressure of the fluid already accumulated in the cavity 54 of the accumulator 18 which fills the cavity 54 passively with additional fluid. The orifice 43 can be employed to moderate the flow through the passage 44 and hence to the accumulator 18. The filling of the accumulator 18 in the system 10 is termed "passive" because it takes place automatically, without any outside intervention or support, solely through the seating of the ball check-valves 28 and 30 and the unseating of the ball check-valve 26. Note that any appropriate mechanism may be utilized in place of the ball check-valves 26, 38, and 30 to affect a passive accumulator fluid fill in the hydraulic control system 10.

The controller 32 governs, that is, actuates, the solenoid valve 20 to close or open the poppet valve 23 by de-energizing or energizing the electro-magnet 21. When the solenoid valve 20 opens, fluid from the accumulator 18 flows into the passage 46. Which, in turn, feeds the fluid to various transmission components via the passages 48, 40, 38, and 34 if the SMA valve 24 is closed, for example, when the fluid temperature is less than the transition temperature, and if the line pressure in the passages 44 and 48 exceeds that the line pressure in the passages 40 and 42 to unseat the ball check-valve 28 and seat the ball check-valve 26, and the line pressure in the passage 40 exceeds the line pressure in passage 38 to unseat the ball check-valve 30.

In sum, when the fluid temperature is less than or about equal to the transition temperature of the valve member 25 alloy, the SMA valve 24 closes (FIG. 1). As such, if the pressure in the accumulator cavity 54 exceeds the line pressure, for example, when the engine and hence the pump 12 is off, then the accumulator retains fluid if the solenoid valve 20 is closed since the pressure differential seats the ball check-valve 26. If the controller 32 instructs the solenoid valve 20 to open, for example, during engine restart, then the accumulator 18 discharges fluid through the passages 46, 48, 40, 38, and 34 to the transmission components since the pressure differential unseats the ball check-valves 48 and 30 and seats the ball check-valve 26. The solenoid valve 20 is generally directed to open following a prolonged engine shut down, which typically leads to a transmission fluid drain into a sump and a subsequent engine restart. Providing pressurized fluid to the transmission components from the accumulator 18 immediately after an engine restart, thereby affords full transmission operation without an otherwise likely delay. Note, however, in some instances the accumulator may draw fluid into the cavity 54 in situations where the line pressure in the passage 42 exceeds that in the passage 44 and the solenoid valve 20 is closed.

On the other hand, when the fluid temperature exceeds the transition temperature of the alloy for the valve member 25 so that the SMA valve 24 opens and then the controller 32 directs the solenoid valve 20 to close, for example, when the engine is on, such that fluid flows into the cavity 54 of the accumulator 18 from the transmission 14 through the passages 34, 42, 44, and 46 since the pressure differential seats the ball check-valves 28 and 30 and unseats the ball check-valve 26. Note that regardless if the SMA valve 24 is open or closed, the accumulator 18 can be discharged if the solenoid valve 32 is open.

Figure 3:
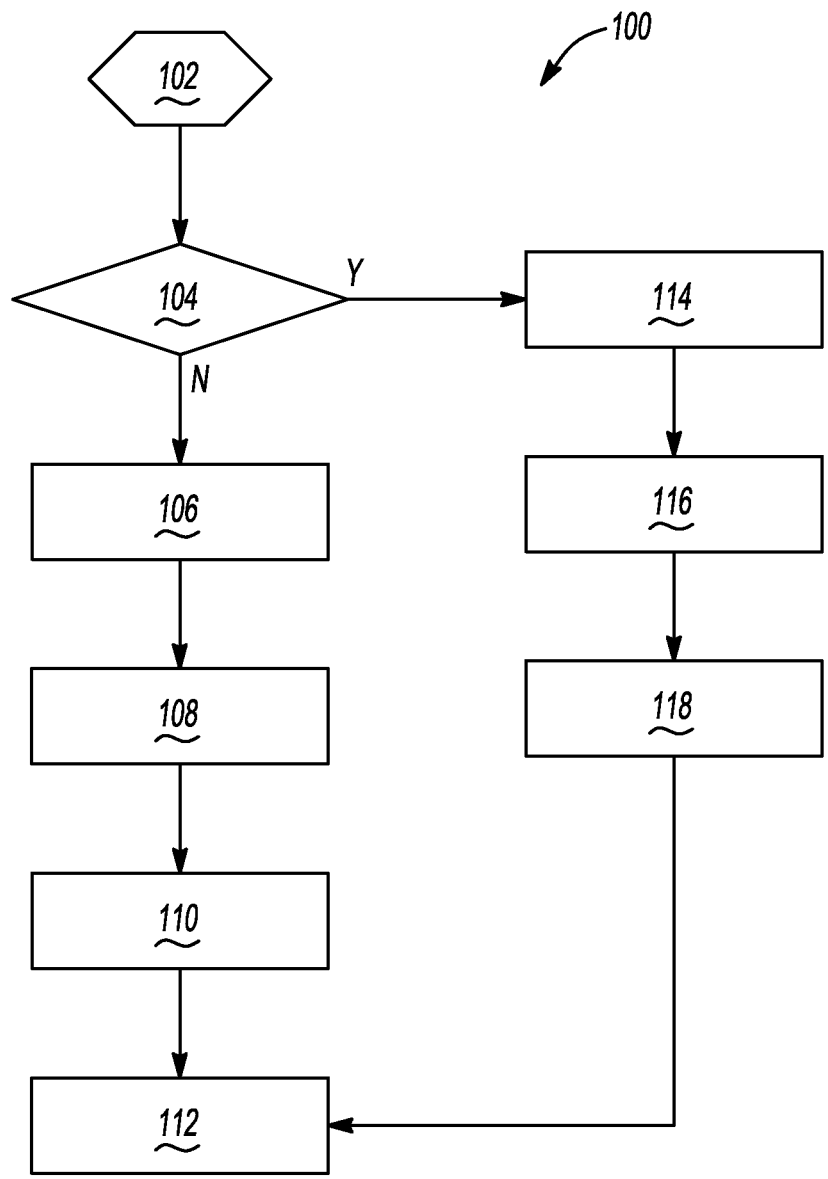
FIG. 3 is a flow chart illustrating a process for the hydraulic control system of FIGS. 1 and 2.

Referring now to FIG. 3, a method 100 for controlling a hydraulic system of a vehicle powertrain having an engine and a transmission is provided and described with respect to the elements of the hydraulic control system 10 of FIGS. 1 and 2. The method 100 commences in block 102. In block 104 the method 100 determines if the fluid temperature exceeds the transition temperature of the alloy for the valve member 25. If the fluid temperature does not exceed the transition temperature (that is, the SMA valve 24 is closed), then in the controller 32 directs the solenoid valve 20 to close (block 108), in which case fluid is retained in the cavity 54, and then directs the solenoid valve 20 to open (block 110), in which case fluid is discharged from the accumulator 18, since the pressure differential unseats the ball check-valves 28 and 30 and seats the ball check-valve 26. The method 100 ends in block 112.

If the decision step 104 determines that the fluid temperature exceeds the alloy transition temperature, then in block 114 the controller 32 directs the solenoid valve 20 to close. In block 116, the pressure differential (that is, the accumulator pressure is less than the line pressure) causes the ball check-valves 28 and 30 to close and the ball check-valve 26 to open, such that in block 118, the accumulator 18 is charged passively with fluid. The method 100 again ends in block 112.

The description of the invention is merely exemplary in nature and variations that do not depart from the gist of the invention are intended to be within the scope of the invention. Such variations are not to be regarded as a departure from the spirit and scope of the invention.

What is claimed is:

1. A hydraulic control system for a vehicle powertrain with an engine capable of being selectively turned on and turned off, the system comprising:
   an accumulator;
   a plurality of fluid passages through which a fluid flows between the accumulator and a transmission associated with the powertrain; and
   a smart memory alloy (SMA) valve in fluid communication with at least one of the fluid passages, the SMA valve having a transition temperature, wherein when the temperature of the fluid is less than or about equal to the transition temperature, the SMA valve closes, and when the temperature of the fluid exceeds the transition temperature, the SMA valve opens, and
   wherein when the SMA valve is closed the accumulator cannot be charged with fluid, and when the SMA valve is open the accumulator charges with fluid passively.

2. The system of claim 1 further comprising a solenoid valve, wherein when the solenoid valve is open the accumulator is able to discharge fluid regardless if the SMA valve is open or closed.

3. The system of claim 2 further comprising a controller that directs when the solenoid valve closes and opens.

4. The system of claim 3 wherein the controller is an engine controller.

5. The system of claim 3 wherein the controller is a transmission controller.

6. The system of claim 3 wherein the controller is a component of a battery pack control module.

7. The system of claim 3 wherein the controller is a component of a body module, a hybrid control module, a combined engine/transition module, or an entertainment system for the vehicle.

8. The system of claim 1 wherein the SMA valve includes a valve member made from Nitinol.

9. The system of claim 1 wherein the SMA valve includes a valve member made from Ag—Cd, Au—Cd, Au—Cu—Zn, Cu—Al, Cu—Al—N, Cu—Zn, Cu—Zn—Al, Cu—Zn—Ga, Cu—Zn—Si, Cu—Zn—Sn, Fe—Pt, Fe—Ni, In—Cd, In—Ti, or Ti—Nb.

10. The system of claim 1 wherein the accumulator includes a spring loaded piston.

11. The system of claim 1 wherein the accumulator includes a compressed gas loaded piston or a combined compressed gas and spring loaded piston.

12. The system of claim 1 wherein the accumulator accumulates fluid when the engine is on, retains the fluid when the engine is turned off, and discharges the fluid to at least one of the fluid passages when the engine is restarted.

13. The system of claim 1 further comprising a plurality of ball check-valves disposed within the plurality of fluid passages, wherein the ball check-valves open and close because of pressure differentials in the plurality of fluid passages to direct the flow of fluid between the accumulator and the transmission.

14. A vehicle powertrain comprising:
   an engine capable of being selectively turned on and turned off;
   a transmission operatively connected to the engine; and
   a hydraulic control system including
   an accumulator,
   a plurality of fluid passages through which a fluid flows between the accumulator and the transmission associated with the powertrain, and
   a smart memory alloy (SMA) valve in fluid communication with at least one of the fluid passages, the SMA valve having a transition temperature, wherein when the temperature of the fluid is less than or about equal to the transition temperature, the SMA valve closes, and when the temperature of the fluid exceeds the transition temperature, the SMA valve opens, and
   wherein when the SMA valve is closed the accumulator cannot be charged with fluid, and when the SMA valve is open the accumulator charges with fluid passively.

15. The powertrain of claim 14 further comprising a solenoid valve, wherein when the solenoid valve is open the accumulator is able to discharge fluid regardless if the SMA valve is open or closed.

16. The powertrain of claim 15 further comprising a controller that directs when the solenoid valve closes and opens.

17. The powertrain of claim 14 wherein the SMA valve includes a valve member made from Ni—Ti, Ag—Cd, Au—Cd, Au—Cu—Zn, Cu—Al, Cu—Al—N, Cu—Zn, Cu—Zn—Al, Cu—Zn—Ga, Cu—Zn—Si, Cu—Zn—Sn, Fe—Pt, Fe—Ni, In—Cd, In—Ti, or Ti—Nb.

18. The powertrain of claim 14 wherein the accumulator accumulates fluid when the engine is on, retains the fluid when the engine is turned off, and discharges the fluid to at least one of the fluid passages when the engine is restarted.

19. The powertrain of claim 14 further comprising a plurality of ball check-valves disposed within the plurality of fluid passages, wherein the ball check-valves open and close because of pressure differentials in the plurality of fluid passages to direct the flow of fluid between the accumulator and the transmission.

20. A method for controlling a hydraulic system of a vehicle powertrain having an engine and a transmission, the method comprising:
   flowing fluid through a plurality of fluid passages between an accumulator and the transmission;
   communicating fluid between at least one of the fluid passages and a smart memory alloy (SMA) valve having a transition temperature;
   opening the smart memory alloy (SMA) valve when the temperature of the fluid is greater than the transition temperature of the SMA valve, the accumulator being charged passively with fluid when the SMA valve is open; and
   closing the SMA valve when the temperature of the fluid is less than or about equal to the transition temperature, the accumulator not being charged with fluid when the SMA valve is closed.

* * * * *